Oct. 13, 1970  S. J. DOKOS  3,533,119
CORDLESS PORTABLE ELECTRIC APPLIANCE
Filed March 6, 1968  6 Sheets-Sheet 1

INVENTOR
SOPHOCLES J. DOKOS
by George R. Clark
ATTORNEY

Oct. 13, 1970 S. J. DOKOS 3,533,119
CORDLESS PORTABLE ELECTRIC APPLIANCE
Filed March 6, 1968 6 Sheets-Sheet 2

INVENTOR
SOPHOCLES J. DOKOS
by George R. Clark
ATTORNEY

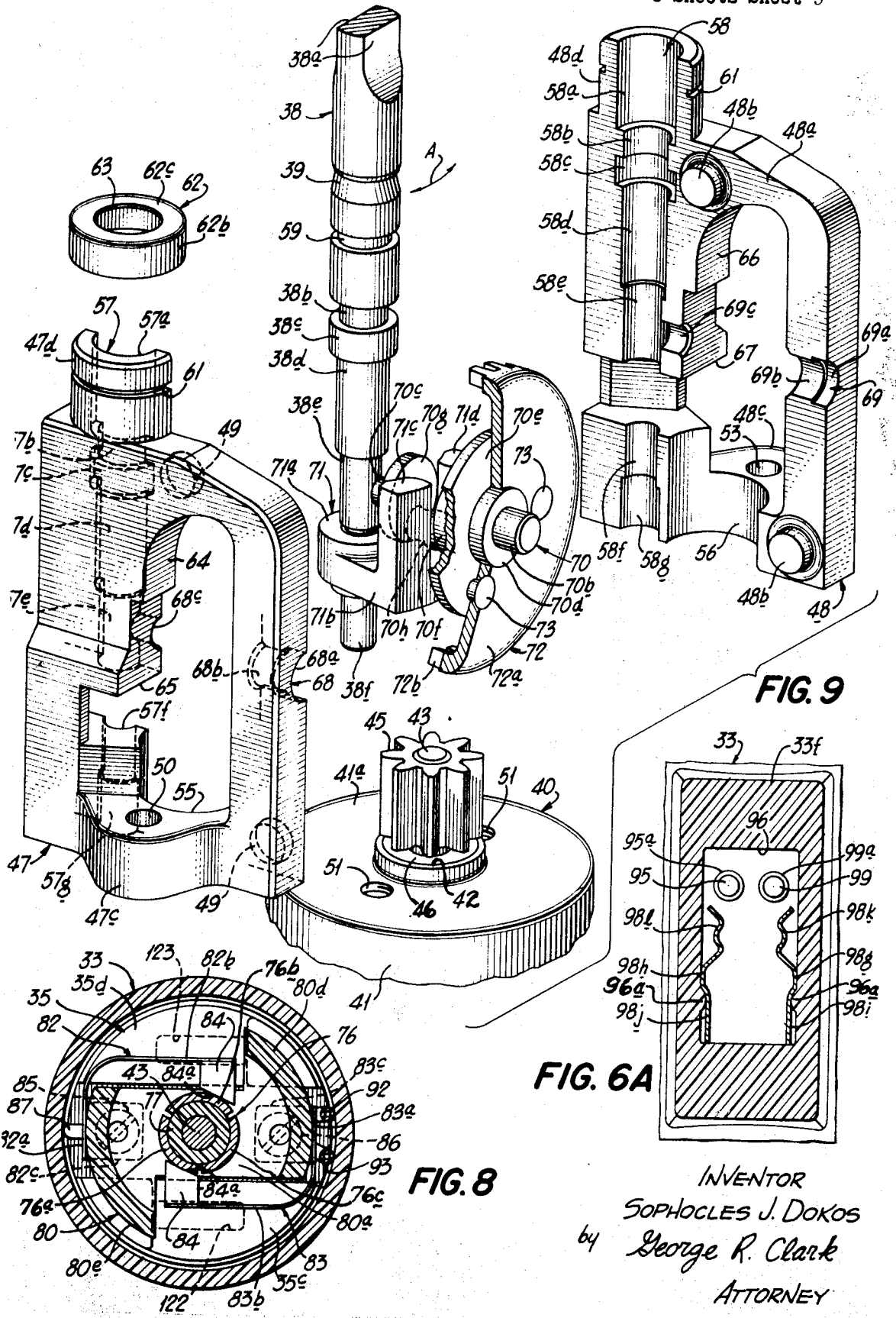

Oct. 13, 1970 S. J. DOKOS 3,533,119
CORDLESS PORTABLE ELECTRIC APPLIANCE
Filed March 6, 1968 6 Sheets-Sheet 4
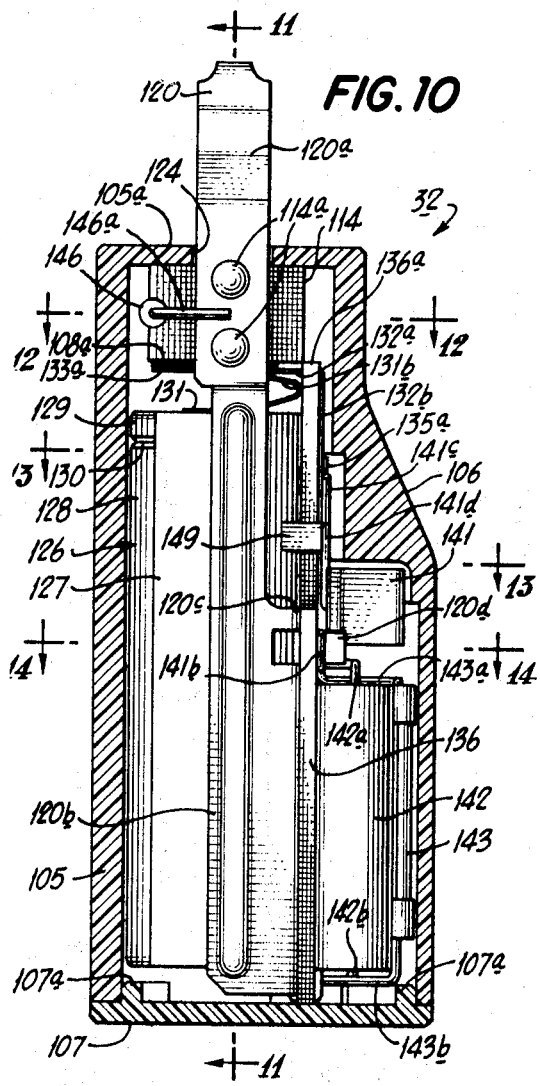
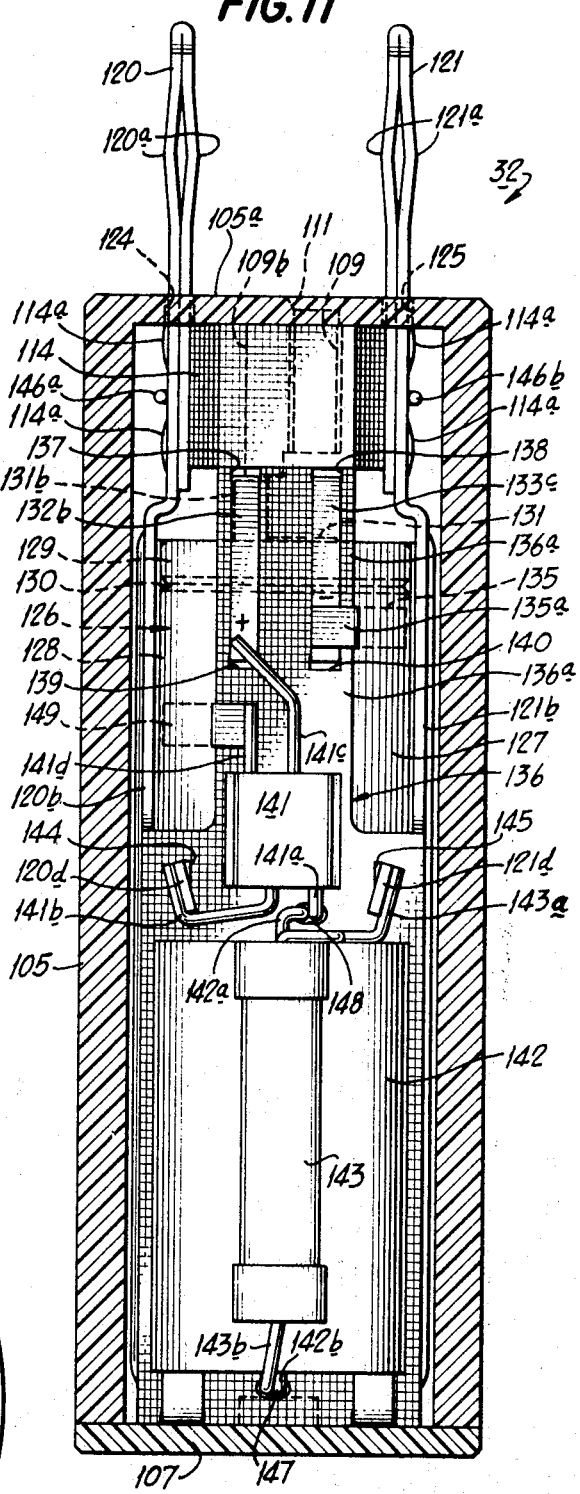
INVENTOR
SOPHOCLES J. DOKOS
by George R. Clark
ATTORNEY Oct. 13, 1970  S. J. DOKOS  3,533,119
CORDLESS PORTABLE ELECTRIC APPLIANCE
Filed March 6, 1968  6 Sheets-Sheet 5

INVENTOR
SOPHOCLES J. DOKOS
by George R. Clark
ATTORNEY

INVENTOR
SOPHOCLES J. DOKOS
by George R. Clark
ATTORNEY

United States Patent Office 3,533,119
Patented Oct. 13, 1970

3,533,119
CORDLESS PORTABLE ELECTRIC APPLIANCE
Sophocles J. Dokos, Oak Park, Ill., assignor to Sunbeam Corporation, Chicago, Ill., a corporation of Illinois
Filed Mar. 6, 1968, Ser. No. 710,932
Int. Cl. A46b 13/02; A61c 17/00
U.S. Cl. 15—22                                   14 Claims

ABSTRACT OF THE DISCLOSURE

A cordless electrical appliance comprising a portable motive power unit for driving an implement, such as a toothbrush, and a separate, rechargeable, portable electric power unit for supplying electric current for said motive power unit when the units are assembled together. The motive power unit comprises an elongated, tubular casing forming a handle portion for the appliance, and an electric motor is mounted in the casing. An output member is drivingly interconnected with the motor and is adapted to movingly drive an implement mounted thereon adjacent one end of the casing. Connector means are provided to supply current to the motor from first terminal means accessible adjacent the opposite end of the casing. The electrical power unit includes an elongated, tubular housing forming a handle portion for the appliance and a rechargeable battery is mounted in the housing. Second connector means are provided for supplying current from the battery through second terminal means on one end of the housing connected to said first terminal means when the casing and housing are assembled together in end-to-end relation. Battery recharging means is mounted in the housing for recharging said battery and includes third terminal means projecting outwardly from one end of the housing adapted for insertion into an external power receptacle when said units are disassembled from one another. Recess means are formed in said opposite end of said casing to receive said outwardly projecting third terminal means when said casing and housing are assembled together in end-to-end relation. The recess means and third terminal means cooperate to releasably secure the casing and housing together in end-to-end assembled relation.

The present invention relates to a new and improved cordless, portable electrical appliance and, more particularly, to an appliance including a motive power unit for driving an implement, such as a toothbrush, and a separate, rechargeable, electrical power unit. When the motive power and the electrical power units are assembled together in end-to-end relation, electrical power is available to energize the motive power unit for driving the toothbrush. The electrical power unit is separable from the motive power unit and is plugged into an external electrical power source for recharging of the battery when the implement is not being used.

In the past, cordless electric toothbrushes have been constructed with a power unit having a drive motor and a rechargeable battery together within a single portable or hand-held housing. When not in use, the portable power unit is placed into a more or less stationary or nonportable charging unit for recharging of the batteries. The charging units used in the past do not lend themselves to portability and many times are permanently affixed to the bathroom wall or a medicine cabinet.

In addition, the charging units are rather large and bulky in apperance and generally include a relatively long electrical cord or power line suitable for plugging into a power outlet in the wall some distance away. Oftentimes, because of the inconvenience of disconnecting and dismounting the charging unit and because of its relatively large size, a user is inclined, when going on a trip, to take along only the portable power unit, and the charging unit is usually left at home. After several days without recharging, the batteries in the portable power unit may run down and the toothbrush then becomes useless until it is recharged.

It is, therefore, an object of the present invention to provide a new and improved cordless, portable, electrical appliance.

Another object of the present invention is the provision of a new and improved cordless electric appliance which eliminates or reduces one or more of the aforementioned difficulties encountered with prior art devices.

Yet another object of the invention is the provision of a new and improved cordless, portable, electrical appliance employing portable motive power or a driver unit and a separate, portable, rechargeable, electrical power unit, both of which units are easily transported and the latter unit being small enough to be conveniently portable and forming a handle portion for the appliance when the two units are assembled together for use in end-to-end relation.

Still another object of the present invention is the provision of a new and improved cordless, portable, electrical appliance including a motive power unit and a separate, detachable, rechargeable, electric power unit, which units may be assembled together in end-to-end relation for use in forming a compact, hand-held appliance, which is light in weight, easy to manipulate, and neat in appearance.

Yet another object of the present invention is the provision of a new and improved cordless electrical appliance having a motive power or driver unit and a separate, rechargeable, electric power unit, the latter unit being easily disassembled from the former and adapted to be directly plugged into an external power source for recharging of the battery when not in use with the motive power unit.

Another object of the present invention is the provision of a new and improved cordless, portable, electrical appliance of the character described wherein the electric power unit includes protruding terminals adapted to be plugged into an external power source for recharging the battery, the terminals also serving to mechanically interconnect the electrical power unit with the motive power unit when the units are assembled together for use.

Still another object of the present invention is the provision of a new and improved cordless electrical appliance of the character described in the preceding object wherein the electrical power unit includes a retractable shield normally extending outwardly of the end of the unit for protecting the user against contact with the protruding terminals when the unit is being plugged into an external power source for recharging, said shield being retractable inwardly into the housing when assembled with a motive power unit or inserted into an external power receptacle for battery charging.

Another object of the present invention is the provision of a new and improved cordless portable electrical appliance comprising a motive power unit having an electric motor for driving a toothbrush or other implement and a separate electrical power unit including a rechargeable battery for energizing the motor when the motive and electrical power units are assembled together for use.

Yet another object of the present invention is the provision of a new and improved cordless, portable, electrical appliance of the character described in the preceding object wherein both the motive power and electrical power units include housing members which form a handle for the appliance when the two units are assembled together in end-to-end relation.

A further object of the present invention is the provision of a new and improved electrical appliance employing a new and improved drive mechanism for drivingly interconnecting an implement driving, oscillating shaft with the rotating armature shaft of an electric motor.

Still another object of the invention is the provision of a new and improved drive mechanism for an electrical appliance for driving an externally extending shaft member to oscillate about its longitudinal axis in response to the unidirectional rotation of an armature shaft of an electric motor.

Further objects and advantages of the present invention will become apparent as the following description proceeds, and the features of novelty which characterize the invention will be pointed out with particularity in the claims annexed to and forming a part of this specification.

Briefly, the foregoing objects and other objects and advantages of the present invention are accomplished by the provision of a new and improved electrical appliance comprising a portable motive power or driver unit for driving a detachable implement, such as a toothbrush or the like, and a separate, self-contained, rechargeable, portable electric power unit for supplying current to the motive power unit when the two units are assembled together in end-to-end relation for use. The motive power unit comprises an elongated tubular casing forming a handle portion for the appliance, and an electric motor is mounted in the casing for driving interconnection with an output shaft member which is adapted to be connected to a toothbrush or other implement externally of the casing. Connector means are provided to supply current for the motor from first terminal means which are accessible adjacent one end of the casing.

The separate, electrical power unit includes an elongated, tubular housing forming a handle portion for the appliance and a rechargeable battery is mounted in the housing. Second connector means are provided for supplying current from the battery through second terminal means on one end of the housing via the first terminal means on the casing of the motive power unit when the two units are assembled together in end-to-end relation for use. Battery recharging means are provided in the housing of the electrical power unit suitable for recharging the battery, and third terminal means are mounted to project outwardly from one end of the housing for insertion into an external power receptacle when the units are disassembled from one another and the battery is to be recharged. Recess means are formed in one end of the casing of the motive power unit to receive the outwardly projecting third terminal means on the housing of the electrical power unit when the two units are assembled together and the recess means and third terminal means cooperate to releasably secure the two units together in assembled end-to-end relation with the housing and casing together, forming an elongated handle for the appliance by which it can be easily manipulated during use.

For a better understanding of the invention, reference should be had to the following detailed description when taken in conjunction with the drawings, in which:

FIG. 5 shows the complete structure;

FIG. 6A is a sectional view taken on line 6A—6A of FIG. 6, assuming that FIG. 6 shows the complete structure;

FIG. 5 shows the complete structure;

FIG. 8 is a transverse sectional view across the lower end of the motive power unit taken substantially along lines 8—8 of FIG. 3, assuming FIG. 3 shows the complete structure;

FIG. 9 is an exploded perspective view illustrating the components of the mechanical drive mechanism of the motive power unit;

FIG. 10 is a longitudinal sectional view of the separate electrical power unit taken substantially along lines 10—10 of FIG. 2;

FIG. 11 is an enlarged longitudinal sectional view taken substantially along lines 11—11 of FIG. 10, assuming FIG. 10 shows the complete structure;

FIG. 12 is a transverse sectional view across the upper end of the electric power unit taken substantially along lines 12—12 of FIG. 10, assuming FIG. 10 shows the complete structure;

FIG. 10 shows the complete structure;

FIG. 10 shows the complete structure;

FIG. 16 shows the complete structure;

Figure 1:
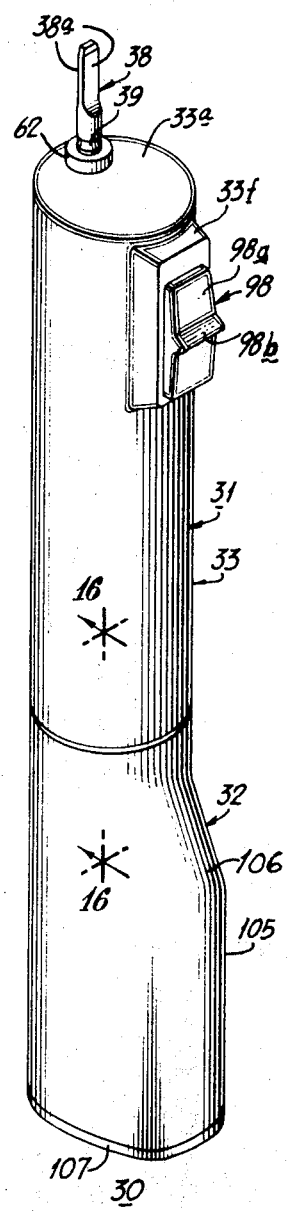
FIG. 1 is a perspective view of one embodiment of a new and improved cordless portable electrical appliance in accordance with the present invention including a motive power or driver unit and a separate electrical power unit, with the units illustrated as assembled together in end-to-end relation ready for use.
Figure 2:
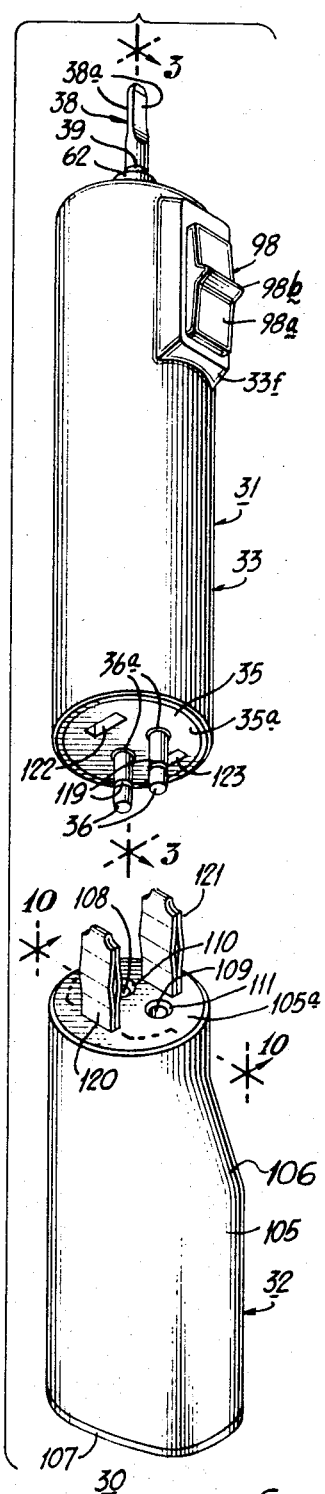
FIG. 2 is an exploded perspective view similar to FIG. 1 but illustrating the appliance when the motive power unit and the electrical power unit have been disassembled from one another.

Referring now, more specifically, to the drawings and particularly FIGS. 1 through 18 thereof, there is illustrated a new and improved cordless, portable, electrical appliance constructed in accordance with the features of the present invention and referred to generally by the reference numeral 30. The electrical appliance 30 is adapted to movably power or drive a toothbrush, or other implement (not shown), mounted thereon and, for this purpose, includes a motive power or mechanical driver unit 31 and a separate, electrical power unit 32. The motive power unit 31 and the electrical power unit 32 are normally assembled together in end-to-end relation when in use, as shown in FIG. 1, and, when the appliance is not being used, the two units are separated or disassembled, as shown in FIG. 2, so that the electrical power unit 32 may be plugged into a convenient wall outlet or other power receptacle for recharging its batteries.

The motive power unit 31 includes an elongated, hollow, tubular casing or housing 33 which forms a handle portion for the appliance and is closed at its upper end by an integrally formed end wall 33a. The lower end of the elongated tubular housing 33 is open and is formed with an internal annular shoulder or recess 34 (FIGS. 3, 16 and 17) adapted to receive a lower end plug or cap member 35 on which is mounted a pair of outwardly projecting, male, electrical terminal pins 36.

The upper end wall 33a of the housing is formed with a circular opening 37 (FIG. 5) eccentric of the longitudinal axis of the housing in order to accommodate an elongated, implement driving, shaft member 38 which extends upwardly from and is supported in the interior of the upper portion of the housing. The shaft member 38 is parallel to the longitudinal axis of the housing and includes an upper end portion externally of the housing having flat surface portions 38a adapted to receive the socket end of a removable toothbrush or other implement (not shown). The upper end portion of the shaft member externally of the housing is also provided with a V-shaped annular groove 39 spaced below the flat surfaces 38a in order to receive one or more movable latch projections provided in the socket of the toothbrush for latching the brush in place on the shaft member.

The shaft member 38 is supported for oscillating movement about its longitudinal axis (as indicated by the curved arrow A in FIG. 9), but is restrained against longitudinal translation, and motive power for oscillation is supplied by a low voltage, direct current, electric motor 40 mounted in the housing 33 midway between the upper and lower ends. The motor 40 is encased within a hollow, cylindrical outer shell or sleeve 41 having a radial, upper end wall 41a formed with a central opening 42 to accommodate an armature shaft 43 of the motor which is aligned with the longitudinal central axis of the housing 33. The upper end of the armature shaft 43 is journaled in an upper bearing grommet 44 seated in the opening 42 provided in the end wall 41a, and the shaft is formed with a splined upper end portion 43a projecting upwardly from the bearing grommet and adapted to carry a pinion gear 45. The bearing grommet 44 is secured in place on the end wall 41a by a washer or bushing 46 (FIGS. 4 and 5) which seals the upper end of the casing 41 around the shaft 43.

Figure 4:
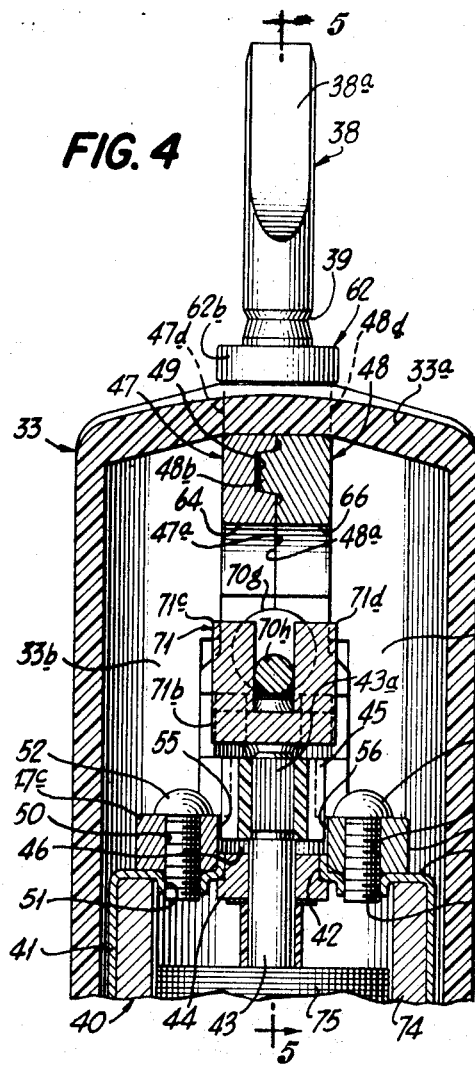
FIG. 4 is an enlarged fragmentary sectional view of the upper end of the motive power unit taken substantially along lines 4—4 of FIG. 3, assuming that FIG. 3 shows the complete structure.
Figure 5:
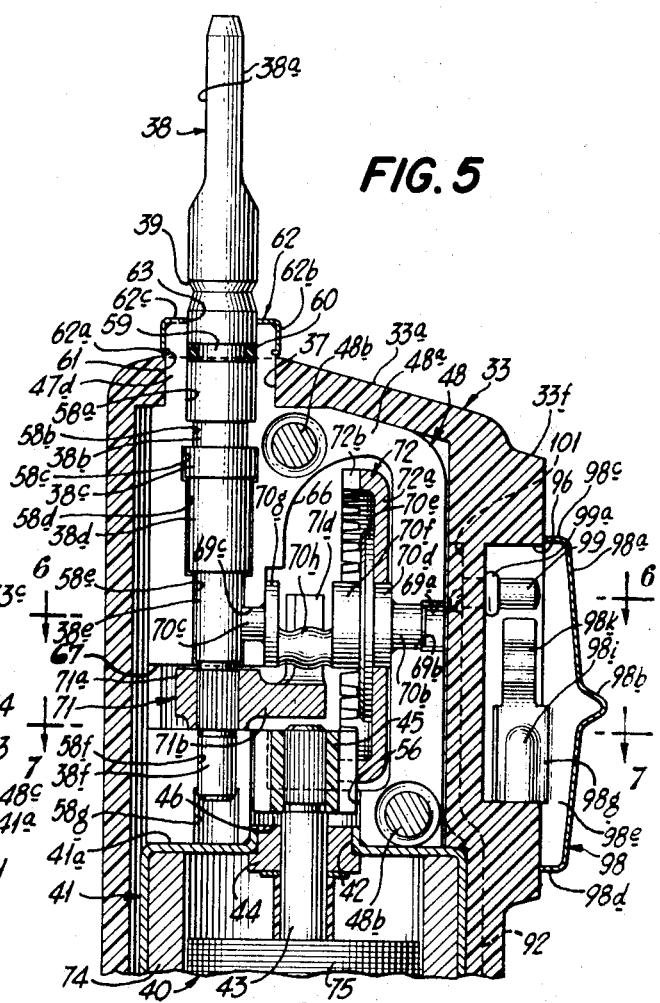
FIG. 5 is a sectional view taken substantially along lines 5—5 of FIG. 4 and illustrating the details of the drive assembly for drivingly interconnecting an implement driving output shaft member with the armature shaft of an electric motor in the motive power unit, also assuming that FIG. 4 shows the complete structure.

In order mechanically to interconnect the rotating armature shaft 43 of motor 40 to drive the oscillating shaft member 38, the motive power unit 31 includes a drive mechanism (illustrated in exploded fashion in FIG. 9) mounted within the upper end portion of the housing 33 above the motor. The drive mechanism includes a pair of substantially identical, upwardly extending support frame members 47 and 48 which are preferably formed of plastic material integrally molded into the intricate shape illustrated. The frame members include opposed, matching planar faces 47a and 48a, respectively, which confront one another and are keyed together when the frame members are assembled together as an integral unit, as shown in FIGS. 4 and 5. The face 47a of the member 47 is a mirror image of the face 48a of the member 48 with the exception that the latter member includes a pair of outwardly projecting, circular bosses or keys 48b formed on the planar face 48a and adapted to key or seat in appropriately located, circular recesses 49 formed in the face 47a of the member 47. When the members 47 and 48 are assembled together with their faces 47a and 48a confronting each other, the circular bosses 48a are seated in the recesses 49, locking the two members against relative sliding movement.

The frame member 47 is formed with a transverse base or web 47c at its lower end and the lower surface of the web is adapted to abut the upper surface if the motor shell, end wall 41a. The web is formed with an opening 50 positioned for alignment with a threaded opening 51 (FIG. 9) formed in the upper end wall 41a of the motor shell, and a threaded cap screw 52 (FIG. 4) is provided to secure the support member 47 in place on the upper end of the motor shell 41. Similarly, the frame member 48 includes a transverse base or web 48c at its lower end adapted to abut the upper surface of the end wall 41a of the motor shell. The web 48c is formed with an opening 53 positioned for alignment with a threaded opening 54 (FIG. 9) diametrically opopsite the other threaded opening 51 in the end wall 41a of the motor shell. A cap screw 54 is provided to secure the frame member 48 in place on the upper end of the motor casing 41 and when the frame members 47 and 48 are assembled together in place on the upper end of the motor shell (as best shown in FIG. 4) the faces 47a and 48a lie on a plane that bisects the longitudinal axis of the housing 33. The transverse bases or webs 47c and 48c of the support frame members are provided with semicylindrical recesses 55 and 56, respectively, which open onto the respective planar faces 47a and 48a and these recesses face one another when the frame members are assembled together to form an enlarged circular opening, the walls of which surround or house the pinion 45 on the splined upper end portion 43a of the armature shaft 43.

In order to support the shaft member 38 for oscillating movement about its longitudinal axis and restrict any longitudinal translation thereof, the faces 47a and 48a of the respective frame members 47 and 48 are provided with elongated, longitudinally extending recesses 57 and 58, in parallel with the longitudinal axis of the housing 33 but transversely offset therefrom. As best shown in FIG. 9, the longitudinal recess 58 includes a plurality of longitudinally spaced, semicylindrical sections or segments 58a, 58b, 58c, 58d, 58e, 58f, and 58g having several different diameters and, likewise, the longitudinal recess 57 in the member 47 includes matching, longitudinally spaced, semicylindrical segments 57a through 57g. When the frame members 47 and 48 are assembled together, the respective matching pairs of semicylindrical segments forming the elongated recesses 57 and 58 combine to form an elongated longitudinal bore of circular cross section having a plurality of longitudinally spaced cylindrical bore segments of different diameter.

The shaft member 38 is formed with several longitudinally spaced segments or portions having different diameters in order that the shaft may be accommodated within the cylindrical bore segments of different diameters formed by the confronting recesses 57 and 58 in the respective frame members 47 and 48. The shaft member 38 includes a short portion 38f at the lower end, having a relatively small diameter and adapted to be journaled within the cylindrical bore segment formed by the cooperating recess surfaces 57f and 58f. Spaced above the shaft segment 38f is another shaft section 38e which is journaled in the bore segment formed by the cooperating recess surfaces 57e and 58e, and immediately above the shaft section 38e is a section 38d of intermediate diameter journaled in the bore segment formed by the recess surfaces 57d and 58d. Immediately above the shaft section 38d is a short segment 38c of larger diameter which is journaled in the bore segment formed by the cooperating recesses 57c and 58c. The segments 38c prevents the shaft member from being displaced longitudinally while still permitting free oscillation of the shaft about its longitudinal axis. A relatively small diameter shaft section 38b immediately above the section 38c is journaled within the bore segment formed by the recess surfaces 57b and 58b and the remaining upper portion of the shaft member is of a substantially uniform diameter except for the flat surfaces 38a at the upper end, the V-shaped groove 39, and an annular groove 59 spaced below the V-groove and adapted to carry an O-ring seal 60 (FIG. 5) which seals around the upper end portion of the shaft member within the bore segment formed by the cooperating recess surfaces 57a and 58a. The O-ring 60 prevents moisture from entering the housing 33 around the projecting outer end portion of the shaft member 38.

The uppermost bore segment surfaces 57a and 58a are formed in a pair of semicylindrical projections 47d and 48d disposed on the upper end of the frame members, and, when the frame members are assembled together, these projections form a cylindrical projection adapted to extend upwardly through the aperture 37 in the end wall 33a of the housing. The projections 47d and 48d are each formed with a groove 61 around the outer surface thereof, and the grooves combine to form an annular recess adapted to receive an in-turned lip or flange 62a (FIG. 5) formed at the lower end of an annular metal cap member 62. As best shown in FIG. 5, the cap member 62 includes a cylindrical sidewall 62b and a radial upper end wall 62c having a central aperture 63 therein to accommodate the upper end portion of the shaft member 38. The cap member 62 is assembled in place on the projections 47d and 48d above the wall 33a and aids in preventing the downward withdrawal of the projections through the opening 37.

The frame member 47 is formed with an enlarged central opening 64 offset transversely of the longitudinal recess 57 and terminated at its lower end by the upper surface of the base portion 47c. The opening 64 is in communication with the longitudinal recess 57 between the surfaces 57e and 57f through a transverse recess or opening 65. The frame member 48 includes a similar enlarged central opening 66 laterally offset from the longitudinal recess 58 and the openings 64 and 66 are shaped as mirror images which match when confronting one another with the frame members 47 and 48 assembled together. The frame member 48 includes a transversely extending recess or opening 67 matching the opening 65 and in communication between the opening 66 and the surfaces 58e and 58f in the longitudinal recess 58. With the frame members 47 and 48 assembled together with their planar faces 47a and 48a in confronting contact, an enlarged open area is provided by the openings 66 and 64 in the respective frame members, and the open area thus formed is in communication with the longitudinal bore formed by the confronting recesses 57 and 58 by means of the registering pair of transverse openings 65 and 67 in the respective frame members.

Figure 6:
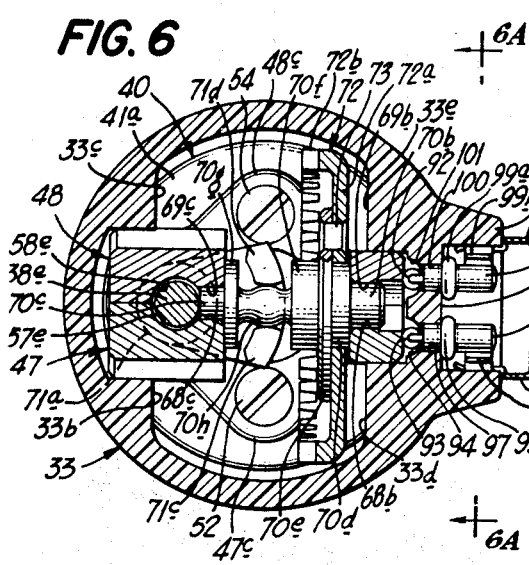
FIG. 6 is a transverse sectional view taken substantially along lines 6—6 of FIG. 5, assuming
Figure 7:
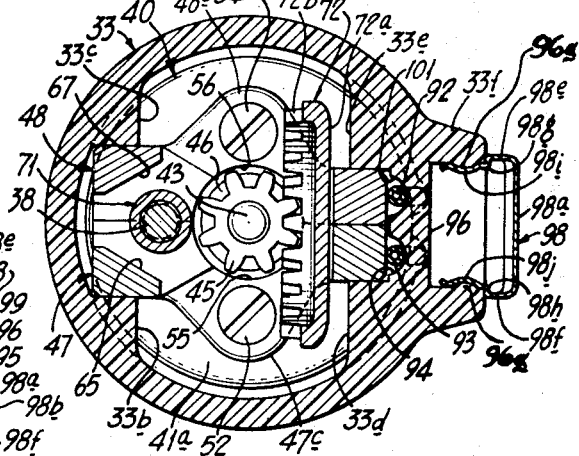
FIG. 7 is a transverse sectional view taken substantially along lines 7—7 of FIG. 5, again assuming

In addition to the primary, upwardly extending recess 57 along the face 47a, the member 47 includes a transversely extending secondary recess 68 comprising several longitudinal spaced, semicylindrical, coaxial segments 68a, 68b and 68c also formed in the planar face 47a. The segments 68b and 68c are spaced on opposite sides of the enlarged central opening 64 and their axes are perpendicular or normal to the longitudinal recess 57 Similarly, the frame member 48 is provided with a transversely extending recess 69 in its face 48a including several longitudinally spaced, semicylindrical, coaxial segments 69a, 69b, and 69c adapted to face and cooperate with the respective segments 68a, 68b, and 68c of the frame member 47, thus forming a longitudinally segmented, transverse cylindrical bore for supporting opposite ends of a crankshaft 70 which forms a connecting drive link for interconnecting the output shaft 38 with the pinion 45. Preferably, the crankshaft 70 is formed of stainless steel and includes a short end portion 70c supported for rotation in the cooperating recess segments 68c and 69c and a short, opposite end portion 70b journaled for rotation in the cooperating recess segments 68b and 69b. The central portion of the crankshaft 70 is disposed within the enlarged openings 64 and 66 in the respective frame members 47 and 48 and includes a cylindrical hub portion 70d adjacent the end portion 70b and a larger cylindrical disc or wheel 70e adjacent the hub. Between the wheel 70e and the other end portion 70c, the crankshaft is provided with a pair of axially spaced apart, cylindrical, crank hubs 70f and 70g interconnected by a crankpin 70h (FIGS. 4, 5, and 9) eccentric of the longitudinal axis of rotation of the crankshaft. As best shown in FIG. 6 of the drawings, the eccentric pin 70h is formed with a central bulbous portion intermediate its ends having an outer surface comprising an annular central portion of a spherical surface. As the crankshaft assembly is rotated about its longitudinal axis of rotation extending through the end sections 70c and 70b, the eccentric pin 70h moves in a circular orbit.

The eccentric pin 70h is drivingly interconnected with the output shaft member 38 by means of a drive fork assembly 71 comprising an annular base portion 71a mounted on the shaft member between the segments 38e and 38f. The annular base supports an integrally formed radially outwardly extending triangular web portion 71b disposed to oscillate radially of the axis of the shaft member within the transverse communicating openings 65 and 67 of the assembled frame members 47 and 48. The web portion 71b supports a pair of upstanding, spaced apart, drive legs 71c and 71d disposed between the crank hubs 70f and 70g and on opposite sides of the eccentric crankpin 70h. The legs 71c and 71d are substantially parallel with the longitudinal axis of the shaft member 38 and the opposed, facing inside surfaces of the respective legs are cylindrically shaped for tangential engagement (FIG. 6) with opposite sides of the spherically surfaced portion of the crankpin 70h. Accordingly, as the crank pin moves in orbit, it is continuously engaged by the cylindrical inside surfaces of the legs 71c and 71d, and thereby causes the shaft member 38 to oscillate back and forth about its longitudinal axis as illustrated by the arrow A (FIG. 9). One or the other cylindrical inside surfaces of the leg 71c or 71d is in continuous tangential driven engagement with the spherically surfaced portion of the eccentric crankpin 70h regardless of the position of the crankpin in its orbit, and the legs are spaced apart by a distance equal to or slightly larger than the spherically surfaced portion of the crankpin so that a smooth, oscillating movement of the shaft member 38 is produced in response to the rotation of the crankshaft 70 in either direction.

The crankshaft 70 is driven by a face gear 72 mounted on the hub portion 70d which includes a relatively large, circular web or body 72a riveted to the disc 70e of the crankshaft by a plurality of rivets 73. The face gear includes a plurality of teeth 72b around the perimeter of the circular body 72a and generally normal to the body for direct, meshing engagement with the teeth on the pinion 45. Preferably, the face gear includes a substantially greater number of teeth than the pinion 45 so that the cranshaft 70 is rotated at a lower speed than the armature shaft 43 of the motor 40.

In order to assemble the drive mechanism of FIG. 9, the O-ring 60 is mounted on the output shaft 38 which is then positioned in the recess 57 or 58 in one or the other of the frame member 47 or 48. The crankshaft 70, with the face gear 72 riveted thereto, is mounted in the transverse recess 68 or 69 of the selected frame member with the crankpin 70h inserted between the spaced apart legs 71c and 71d of the drive fork assembly 71. The frame members 47 and 48 are then assembled together with their planar faces 47a and 48a in matched confronting contact and are cemented together. After the cement dries, the shaft member 38 and the crankshaft 70 are journaled in the proper position within the assembled support frame, and the completed assembly is attached to the upper end of the motor 40 by insertion and tightening of the cap screws 52 and 54 which extend through the openings 50 and 53 in the base 47c and 48c of the frame members and are threadedly engaged in the aperture 51 in the upper end wall 41a of the motor shell 41. The assembled drive mechanism and motor are then inserted as a unit into the housing 33 from the lower open end and moved upwardly until the frame member projections 47d and 48d protrude upwardly through the opening 37 in the housing end wall 33a (FIG. 5). Cement is applied to the outside surface of the projections 47d and 48d to seal around the opening 37 against the entrance of moisture, and the metal cap 62 is put in place as shown around the projecting upper end portion of the shaft member 38 with the lower lip 62a seated in the grooves 61.

Figure 3:
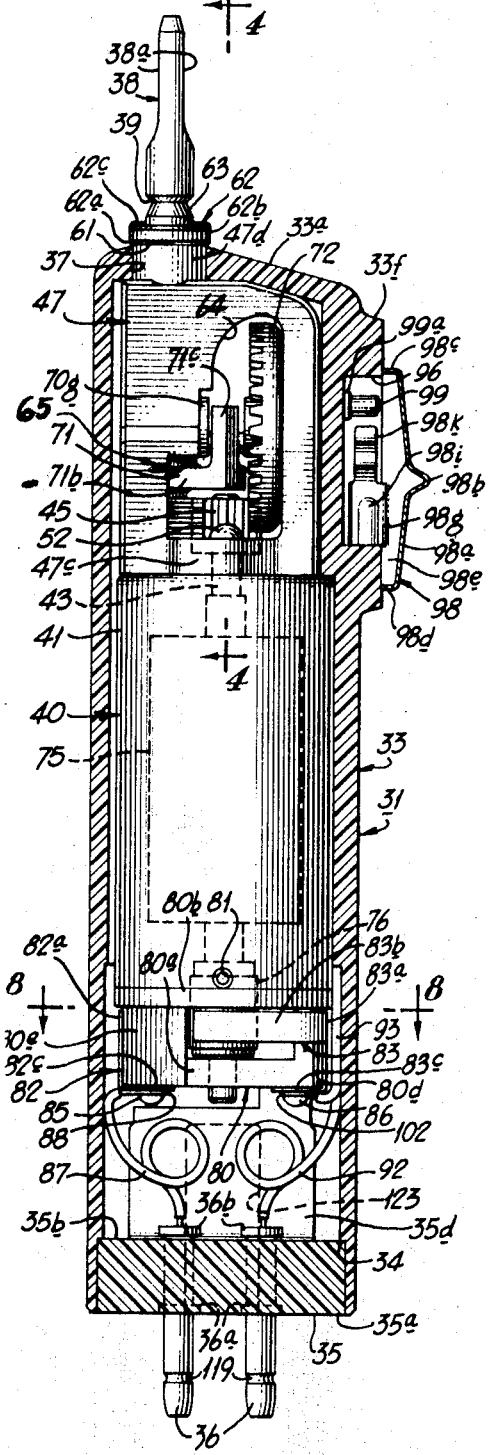
FIG. 3 is a longitudinal sectional view of the motive power unit taken substantially along lines 3—3 of FIG. 2.

When the motor and assembled support frame are fully inserted in the housing 33, as shown in FIG. 3, the upper end surfaces of the frame members 47 and 48 bear against the inside surface of the housing end wall 33a and limit further upward movement of the motor and frame assembly in the housing. The housing 33 is formed with two pairs of spaced apart, longitudinal ribs 33b and 33c, and 33d and 33e (FIGS. 6 and 7) formed on the inside surface thereof and opposite sides of the assembled frames 47 and 48 are disposed between the ribs in each pair preventing any rotation of the frame or motor within the housing.

The motor casing or outer shell 41 is slightly smaller in diameter than the internal diameter of the housing 33 to permit easy insertion of the motor and drive mechanism into the housing from the lower end. The motor shell is open at its lower end (FIG. 16) and encloses a tubular, annular field magnet 74, preferably of the permanent magnet type. The field magnet 74 includes a large axial bore in which is disposed a motor armature 75 carried on the armature shaft 43 intermediate the opposite ends thereof for rotation within the magnetic field set up by the annular field magnet. When the windings of the armature 75 are energized with electric current, the magnetic field induced thereby causes the armature and shaft 43 to rotate for driving the shaft member 38 at the upper end of the housing.

In order to supply electric current to the windings in the armature 75, a commutator assembly 76 (FIGS. 3, 8, and 16) is mounted on the lower end portion of the armature shaft 43 projecting downwardly of the armature body. The commutator assembly includes a plurality of commutator segments 76a, 76b, and 76c radially spaced and electrically insulated from each other and mounted on an insulating tubular sleeve 77 (FIG. 8) carried by the armature shaft. The lower end of the armature shaft 43 is supported for rotation in a grommetlike tubular bearing 78 (FIG. 16) which, in turn, is supported in a circular opening 79 formed at the center of diametrically extending support leg 80a of a lower end plug assembly 80 of the motor. The plug assembly 80 includes an annular ringlike upper portion 80b having a shouldered portion 80c of reduced diameter (FIG. 16) adapted to project upwardly into the lower end of the motor shell 41. The plug assembly is held in place at the lower end of the motor shell by a plurality of radially extending spaced rivets 81 which project through the shell and the shouldered portion 80c. The support leg 80a is spaced below the annular ringlike portion 80b by a pair of downwardly depending, integrally formed support legs 80d and 80e (FIG. 8). The support legs 80d and 80e comprise a pair of cylindrical segments diametrically spaced apart on opposite sides of the armature shaft and additionally provide support for a pair of brush spring assemblies 82 and 83 for supplying electric current to the commutator segments 76a, 76b, and 76c of the commutator.

The brush spring assemblies 82 and 83 are identical and include upstanding vertical legs 82a and 83a bearing against the outside surface of the respective support legs 80e and 80d of the motor plug assembly 80. The upper ends of the legs 82a and 83a are integrally joined to transversely extending, integrally formed, brush-supporting spring legs 82b and 83b, respectively, disposed on opposite sides of the commutator assembly 76.

At the outer free end of each brush-supporting leg is mounted a brush block 84 having a contact face 84a (FIG. 8) in tangential contact against the surface of the adjacent armature segment. The brush blocks are preferably constructed of carbon or the like and the supporting legs resiliently bias the brush blocks against the commutator segments to effect the desired contact pressure. The brush spring assemblies are secured to the motor plug assembly 80 by means of transverse, base leg portions 82c and 83c, respectively, which bear against the underside of the diametrically disposed integral support leg 80a and fastening screws 85 and 86 project upwardly through openings in the base leg portions 82c and 83c into diametrically spaced threaded apertures formed on the support leg 80a.

Figure 17:
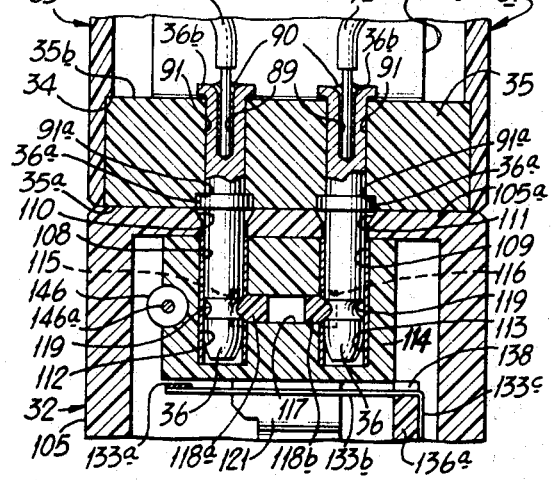
FIG. 17 is a fragmentary sectional view taken substantially along lines 17—17 of FIG. 16, assuming

Current is supplied to the brush spring assembly 82 through lead wire 87 having a lug 88 at its upper end contacting the base leg 82c and secured in contact therewith by the screw 85. The lower end of the lead wire 87 is connected to one of the terminals 36 in the plug member 35 by soldering, as best shown in FIG. 17. For this purpose, the terminals 36 are provided with blind axial bores 89 at their upper ends and the lead wires are inserted into these bores and secured therein by solder 90.

As best shown in FIG. 17, the plug member 35 inserted into the lower end of the housing 33 is formed with a pair of spaced-apart, vertical bores 91 for receiving the terminal pins 36. Each terminal pin includes an outwardly projecting annular ridge 36a formed intermediate its ends and adapted to seat in an enlarged shouldered recess 91a formed at the lower end of the bore 91 adjacent the lower end surface 35a of the plug member. Once the terminal pins 36 have been inserted in the respective bores 91 in the plug member 35 with the ridges 36a seated in the shouldered recesses 91a, the upper ends of the pins are swaged to form outwardly extending annular flanges 36b at the upper ends thereof, which flanges bear against an upper transverse planar surface 35b of the plug parallel to the lower surface 35a.

The brush spring assembly 83 is electrically connected to the other terminal pin 36 by a pair of leads 92 and 93 which are selectively connected and disconnected by a switch adjacent the upper end of the driver unit 31. The lead 93 includes a lug 102 at its lower end in contact with the base leg 83c of the brush spring assembly 83 and secured in contact by the screw 86. This lead extends upwardly from the lower end of the housing to the switch and in order to accommodate and protect the lead, a longitudinal groove 94 (FIGS. 6 and 7) is formed on the inside surface of the tubular sidewall of the housing 33. The upper end of the lead 93 is soldered to the inner end of a first switch terminal 95 mounted on the inside wall of a rectangular switch recess 96 formed in the exterior wall of the housing in a generally rectangular, outwardly extending boss or projection 33f provided adjacent the upper end of the housing. The switch terminal 95 is mounted in a short transverse bore 97 which communicates between the groove 94 and the outer switch recess 96, and the terminal extends outwardly from the inside wall of the recess for selective engagement with a contact member of a movable switch member 98.

The upper end of the other lead 92 is soldered to the inner end of a second switch terminal 99 also mounted in the recess 96 and spaced laterally of the first switch terminal 95. The terminals 95 and 99 are identical and the terminal 99 is mounted in a short, transverse bore 100 communicating between the outside recess 96 and a longitudinal groove 101 (FIG. 7) formed in the inside wall of the housing parallel to and spaced from the groove 94. The lead 92 extends downwardly in the groove 101 into the lower end of the housing, and the lower end of the lead is soldered in the socket 89 in the other terminal 36, as shown in FIGS. 3 and 17. The switch terminals 95 and 99 are secured in place within the respective bores 97 and 100 by annular ridges 95a and 99a which prevent longitudinal movement of the pins and seal the bores against the entrance of moisture and the like into the interior of the housing from the external switch recess 96.

The switch member 98 is preferably formed of stamped metal or plastic material and is mounted for longitudinal sliding movement along the outer surface of the boss or projection 33f around the switch recess 96. The switch member includes an outer wall 98a having an outwardly extending, transverse ridge 98b formed intermediate the upper and lower ends to facilitate movement of the switch upwardly from the open position (FIGS. 3 and 5) to a closed position (not shown) wherein the terminals 95 and 99 are electrically interconnected to drive the motor 40. The switch member includes a pair of integrally formed end walls 98c and 98d and a pair of integrally formed longitudinally extending sidewalls 98e and 98f. The inner edges of the end walls and sidewalls bear against the flat outer surface of the boss or projection 33f around the recess 96 and guide the switch member as it is moved up and down to connect and disconnect the switch terminals 95 and 99.

Referring to FIGS. 5 and 6, the switch member 98 is removably secured to the housing 33 by a pair of inwardly projecting, integrally formed, retainer lugs 98g and 98h formed along the inner edges of the sidewalls 98e and 98f to project inwardly into the recess 96 of the housing. The lugs 98g and 98h are formed with longitudinally extending, fluted portions 98i and 98j of concave or button cross section (FIG. 6) which bear against respective projections 96a formed on opposite, longitudinal sidewalls of the recess 96. Engagement between the buttons 96a and the fluted portions 98i and 98j retain the switch member 98 in place on the housing boss 33f and permit longitudinal movement of the switch on the housing between the ON and OFF positions. When the switch is in the OFF position, as shown in FIG. 5, the lower ends of the retainer lugs 98g and 98h bear against the lower end surface of the recess 96 and limit further downward travel of the switch member. In this position, the upper ends of the retainer lugs 95 and 99 are spaced below the switch terminals 95 and 99 and accordingly the switch terminals are not interconnected. The upper end portions of the retainer lugs are formed to provide a pair of spring contact fingers 98k and 98l for engagement with the switch terminals 95 and 99 to electrically interconnect the terminals when the switch is moved upwardly to the ON position. As shown in FIG. 6A, the contact fingers 98k and 98l are formed with transverse recesses to accommodate the switch terminals and hold the switch in the ON position. The contact fingers are normally biased toward one another and the respective switch terminals, and when the switch member is moved upwardly to the ON position, the fingers contact their respective terminals and complete the circuit therebetween, thus energizing the motor 40 to drive the shaft member 38 as aforesaid.

Electrical power is supplied to the terminals 36 at the lower end of the drive unit 31 when the electrical power unit 32 is assembled therewith or plugged in, as shown in FIG. 1. When the two units are disassembled, as shown in FIG. 2, no electrical power is available to drive the motor and, hence, for use, the two units must be plugged together as shown.

The electrical power unit 32 includes an elongated, hollow, tubular housing 105 having a circular cross section at its upper end portion (FIGS. 2 and 12) of a diameter approximately equal to the diameter of the tubular housing 33 of the motive driver unit 31. The lower end portion of the housing 105 is somewhat oval or oblong in transverse cross section (FIGS. 12, 13, and 14) and forms a handle butt portion 106 for the assembled units so that they are easily handled, and the user's hand may be conveniently placed around the said portions of the assembled housings between the switch member 98 and the enlarged butt portion, at the lower end of the electric power unit 32. Preferably, the upper end of the housing 105 is closed by an integrally formed upper end wall 105a adapted to abut the lower face 35a of the lower end plug of the motive unit 31 when the units are plugged together for use. The lower end of the housing 105 is open and is closed by a lower end plug member or cap 107 (FIGS. 10 and 11) cemented in place after the interior components have been inserted in the housing. The cap member is formed with a pair of arcuate ridges 107a (FIG. 10) on its upper face which bear against the inside surface of the housing 105 and help to hold the cap member in proper alignment.

In order to mechanically and electrically interconnect the motive power unit 31 with the electrical power unit 32 when the units are assembled or plugged together for use, as shown in FIG. 1, a pair of electrical sockets or sleeves 108 and 109 of conducting material are mounted in the casing 105 adjacent the upper end beneath the end wall 105a for receiving the downwardly projecting lower end portions of the terminal pins 36. The sockets 108 and 109 are in coaxial alignment with appropriately located circular apertures 110 and 111, respectively, formed in the upper end wall 105a of the housing 105 and are seated within spaced parallel bores 112 and 113, respectively, formed in a contact mounting block 114 secured to the inside surface of the end wall 105a within the upper end portion of the housing. The sockets 108 and 109 are provided with facing slots 115 and 116, respectively, intermediate their ends (FIGS. 15 and 17) which are in communication with a common slot 117 extending transversely through the mounting block 114 between the upper and lower ends thereof. The slot 117 is provided to accommodate a U-shaped latch member 118 (FIGS. 12, 16, and 17) fabricated of resilient material, such as that sold under the trade name "Nylon." The latch member 118 includes a pair of spaced apart, springlike legs 118a and 118b integrally joined at one end by a bight portion 118c (FIG. 12). The outer sides of the legs are beveled along the upper and lower edges, as best shown in FIG. 17, and normally project into the interior of the sockets 108 and 109 through the respective slots 115 and 116 therein (FIG. 12). Each of the terminal pins 36 is provided with an annular groove 119 spaced upwardly of its lower end and after full insertion of the terminals 36 into the sockets 108 and 109 the legs 118a and 118b are engaged in the annular grooves to latch the pins within the sockets. During assembly and disassembly of the power units 31 and 32, the legs of the latch member are cammed inwardly toward one another by the pins 36 and full insertion of the pins in the respective sockets 108 and 109 is obtained, and after full insertion the legs move outwardly into the groves 119 on the terminal pins to latch the power units together.

Figure 16:
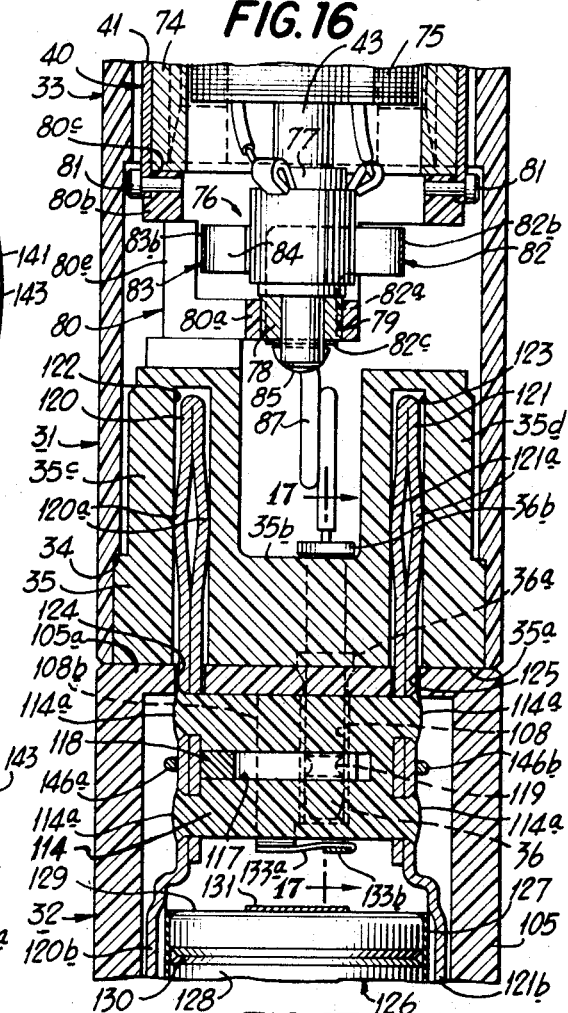
FIG. 16 is a fragmentary, longitudinal, sectional view taken substantially along lines 16—16 of FIG. 1 and illustrating the end portions of the motive power unit and the electric power unit when the two units are assembled and secured together in end-to-end relation.

In addition to the pin and socket connections just described, the power units 31 and 32 are also mechanically interconnected when assembled together by a pair of spaced apart plug terminals 120 and 121 which project upwardly from the end wall 105a of the electrical power unit and are adapted to be received in a pair of blind recesses 122 and 123, respectively, formed in the lower plug or cap member 35 of the motive power unit 31 (FIG. 16). The recesses 122 and 123 are formed in a pair of integrally formed, spaced apart, projections or bosses 35c and 35d, respectively, which extend upwardly of the planar surface 35b of the plug member 35 bearing against the annular shoulder 34 in the lower end portion of the housing 33. The upper end of the projection 35c bears against the lower surface of the motor end plug assembly 80 and, accordingly, aids in preventing longitudinal shifting of the motor 40 within the housing 33. The plug terminals 120 and 121 are sized and spaced apart to fit into an ordinary 110-volt AC convenience outlet when the battery in the electrical power unit 32 is to be recharged and the upper portions of the terminals are formed from a continuous strip of conductive metal doubled over as best shown in FIG. 11, thereby providing a rounded upper end and spaced apart, outwardly divergent intermediate spring portions 120a and 121a, respectively, which act to hold the terminals in place after insertion into a convenience outlet for recharging or the recesses 35c and 35d of the motive power unit.

From the foregoing description it will be seen that the plug terminals 120 and 121 and the terminal pins 36 have both electrical and mechanical functions, and it should be noted that sockets 108 and 109 are spaced closer to the plug terminal 121 than the terminal 120 so that proper polarity is always insured between the battery in the electrical power unit 32 and the motor in the motive power unit 31 when the units are assembled or plugged into each other. Moreover, it should be noted that the housings or casing 35 and 105 both serve as handle portions for the assembled device, which is cordless and truly a portable implement. Furthermore, because the electrical power unit 32 is relatively small and the battery therein is rechargeable by insertion of the plug terminals 120 and 121 into a conventional AC power outlet, no cumbersome power cable or cord is required, and the device 30 is a truly portable, cordless, power unit for driving a toothbrush or other implement.

The plug terminal members 120 and 121 extend downwardly into the interior of the housing 105 through a pair of spaced openings 124 and 125 (FIGS. 10 and 11) in the upper wall 105a, and are supported on opposite side faces of the contact mounting block 114. To this end, the terminal members are formed with a pair of apertures therein and the side faces of the mounting block are provided with pairs of outwardly extending circular projections or bosses 114a which project through these apertures and are enlarged at their outer ends and flattened against the outside faces of the terminal members. The contact mounting block 114 is fabricated of insulating plastic material and the end portions of the bosses 114a projecting through the apertures in the plug terminal members are enlarged and flattened against the outside faces of the terminal members by heat and pressure, much in the same way that a rivet is upset.

Figure 13:
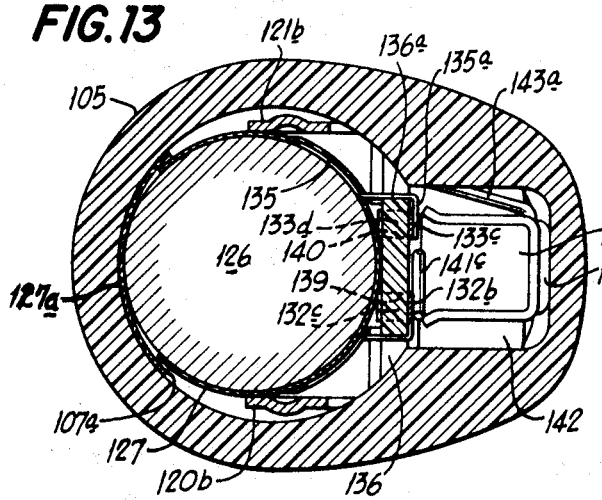
FIG. 13 is a transverse sectional view taken substantially along lines 13—13 of FIG. 10, again assuming
Figure 14:
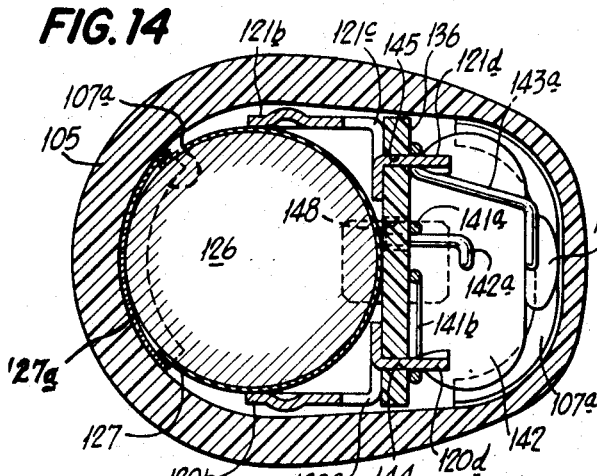
FIG. 14 is another transverse sectional view taken substantially along lines 14—14 of FIG. 10, again assuming

As illustrated best in FIGS. 10 and 11, the plug terminal members 120 and 121 extend longitudinally within the housing almost the entire length thereof, terminating just above the lower cap member 107. As viewed in FIG. 11, the terminal members are offset laterally outwardly beneath the contact mounting block 114 and include enlarged lower end portions or legs 120b and 121b formed with elongated stiffening ribs therein. The legs 120b and 121b are disposed on opposite sides of a cylindrical, rechargeable battery 126 and are insulated from the outer shell of the battery by a sheet of thin insulating material 127 (FIGS. 13 and 14). Another piece of insulating sheet 127a is used to space the shell of the battery from the inside surface of the housing.

Figure 15:
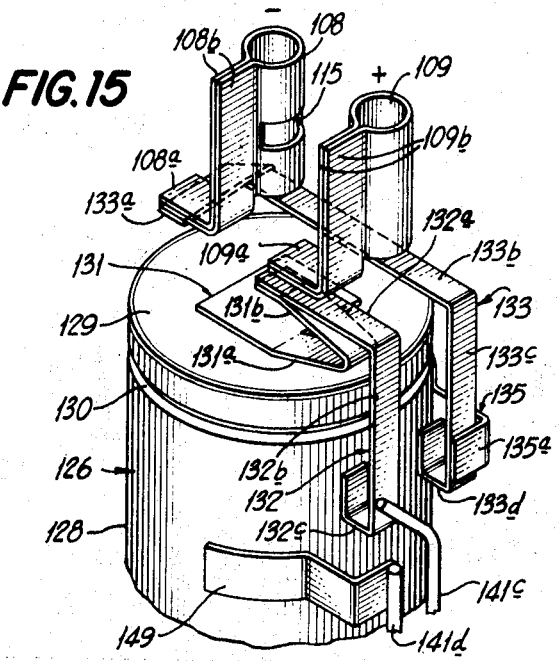
FIG. 15 is a fragmentary, perspective view of interior components mounted in the upper end portion of the electric power unit.

Several different types of rechargeable batteries may be used and, typically, these types of batteries include a large lower cylindrical shell or casing 128 which serves as the negative terminal thereof and a smaller upper end cap 129 separated from the lower shell by an annular insulating ring (FIG. 15) 130. The upper end cap 129 serves as the positive terminal of the battery and is electrically connected to the socket 109 by a generally U-shaped spring contact member 131 having a lower leg 131a having an enlarged end portion spot welded to the upper end face of the positive terminal cap (FIG. 15). The spring contact member 131 includes an upper leg 131b and the outer end of this leg is electrically connected to the end of the upper leg 132a of an L-shaped conductor 132 by spot welding or the like. The outer end portion of the contact leg 132a is in turn electrically connected by spot welding to a transverse tab 109a integrally joined to the lower end of one of a pair of welded together side flanges 109b extending radially outward of the cylindrical socket.

The socket 108 includes similar welded together, radially extending side flanges 108b, and the lower end portions of these flanges are bent outwardly to form tabs or connecting lugs 108a which are spot welded to a short projection 133a extending laterally from the outer end of the upper leg 133b of another L-shaped conducting member 133. The upper transverse legs 132a and 133b of the L-shaped conducting members are spaced upwardly of the battery terminal cap 129 and are parallel (FIG. 15), and each conductor member also includes a downwardly extending leg spaced outwardly of the cylindrical sidewall of the battery. The L-shaped conductor 133 includes a downwardly extending leg 133c having a U-shaped hook portion 133d at the lower end, and this portion is electrically connected to the sidewall of the negative battery shell 128 by a short bracket 135 spot welded at its inner end to the battery case and at its outer end 135a to the lower end of the leg 133c. The L-shaped conductor 132 includes a downwardly extending leg 132b having a U-shaped hook portion 132c at its lower end and this leg is also spaced outwardly of the battery shell and is parallel to the leg 133c (FIG. 15).

Spacing between downwardly extending legs 132b and 133c and the adjacent wall of the battery casing is maintained by a relatively large longitudinally extending insulating spacer board 136 (FIG. 11) having an upper portion 136a forming a tonguelike projection of reduced width with openings or slots 137 and 138 at the upper end for accommodating the upper legs 132a and 133b. The insulating board tongue 136a also includes a pair of openings 139 and 140 (FIG. 11) spaced below the upper end in order to accommodate the hooked lower end portions 132c and 133d of the respective L-shaped conductors which secure the lower end portions of the legs 132b and 133c firmly to the board. The wider, lower end portion of the board 136 serves to divide the enlarged lower end portion of the housing 105 into two compartments, one of which houses the lower end of the battery 126 and the other of which houses a bridge-type rectifier 141, a capacitor 142, and a fuse 143. In addition, the lower portion of the insulating board 136 serves as a mounting board for these charging circuit components and helps to structurally interconnect the plug terminal legs 120b and 121b.

To this end, the legs 120b and 121b are provided with L-shaped transversely extending lugs 120c and 121c (FIG. 14) having outer legs which bear against the adjacent surface of the terminal board. Immediately below the lugs 120c and 121c, L-shaped terminal members 120d and 121d (FIG. 14) are provided, and these members include outwardly extending terminal lugs projecting through openings 144 and 145 (FIG. 11) in the terminal board. The outer ends of the lugs are twisted axially, as shown in FIG. 11, and thereby lock the terminal board to the terminal plug members 120 and 121 and, in addition, the lugs serve as terminals for connecting AC power to the rectifier 141, capacitor 142, and fuse 143.

Figure 18:
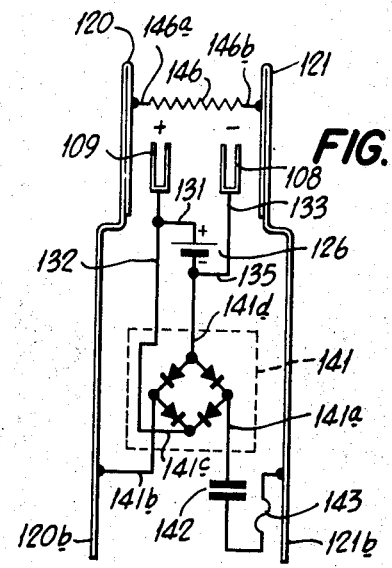
FIG. 18 is a schematic wiring diagram of a recharging circuit for the electric power unit of the appliance.

FIG. 18 schematically illustrates the circuit diagram for recharging of the battery 126 when the electrical power unit 32 is plugged into an AC convenience outlet. AC voltage is applied across the plug terminals 120 and 121 and the fuse 143 and capacitor 142 are connected in series between the plug terminal 121 and a terminal lead 141a of the bridge rectifier 141. The opposite terminal lead 141b of the rectifier is connected to the plug terminal 120 and, accordingly, the AC voltage across the terminal leads 141a and 141b of the rectifier is greatly reduced below the 110 AC line voltage by the series capacitor 142 to a value of about 1.5 volts RMS for charging the battery. A positive output lead 141c of the rectifier is connected to the socket 109 and positive terminal cap 129 of the battery 126, while the negative output lead 141d of the rectifier is connected to the negative socket 108 and the negative casing portion 128 of the battery. The bridge rectifier 141 thus provides rectified full-wave DC current at an appropriately low voltage to recharge the battery and, as the charged state of the battery changes, the internal resistance changes and the charging current through the battery is regulated accordingly.

The series capacitor 142 is essentially a voltage dropping impedance to reduce the line voltage to a relatively low valve for recharging the battery, and the provision of a capacitor for this purpose results in a lower cost than if a transformer or resistor were used. Moeover, the capacitor generates very little heat compared with a resistor and is generally smaller in size and weight and lower in cost, as compared to a transformer. In order to prevent the capacitor 142 from holding a charge after the electrical power unit 32 is unplugged from an AC convenience outlet, a relatively high value bleeder resistor 146 is connected between the plug terminals 120 and 121. The body of the resistor 146 is mounted in a suitable recess (FIG. 17) formed on one side face of the contact mounting block 114 at the upper end of the housing 105, and the end leads 146a and 146b of the resistor are connnected to the respective plug terminals by spot welding or other suitable means.

As best shown in FIG. 11, an upper end lead 143a of the fuse 143 is connected to the lug 121d of the plug terminal member and a lower end lead 143b of the fuse is connected to a lower end lead 142b of the capacitor by a common lug 147 mounted on the outer surface at the lower end of the terminal board 136. The capacitor includes an upper end lead 142a which is connected to the lead 141a of the rectifier by a common lug 148 mounted on the terminal board and the rectifier lead 141b is spot welded to the lug 120d of the plug terminal 120. The positive lead 141c of the rectifier is spot welded to the lower end of the leg 132c of the positive L-shaped conductor 132 and the negative lead 141d of the rectifier is connected to the negative casing 128 of the battery by means of a lug 149 spot welded to the battery wall and extending outwardly thereof for connection by spot welding to the lead 141d (FIG. 15).

All of the various electrical components in the electrical power unit 32 are assembled and connected externally of the housing 105 on the mounting board 136, and the assembly is then inserted upward into the housing from the lower end until the upper face of the contact mounting block 114 bears against the interior surface of the end wall 105a. The lower end cap 107 is then put in place on the lower end of the housing and the electrical power unit is ready to be used.

When the motive power unit 31 and electrical power unit 32 are assembled or plugged together for use, DC current is supplied from the battery 126 through the sockets 108 and 109 and pins 36 to drive the motor 40. The switch member 98 is manually operated to turn the motor on and off. After the user has finished, the units 31 and 32 are disassembled or unplugged from one another and the electrical power unit may then be plugged into an AC wall outlet for recharging of the battery 126 while not in use. Both the motive power and electrical power units are light and compact and are easily transported. No long and cumbersome cord is required for the electrical power unit 32 which is simply plugged directly into a wall outlet for recharging. Excellent electrical and mechanical interconnection between the units 31 and 32 is achieved by the plurality and male and female connecting means described, and proper polarity is always obtained when the units are plugged together. Moreover, the housings or casing 33 and 105 cooperate to provide a continuous handle to facilitate holding of the device 30 and the handle butt portion 106 on the lower end portion of the housing 105 prevents the user's hand from inadvertently slipping off the lower end of the plugged together assembly.

Figure 19:
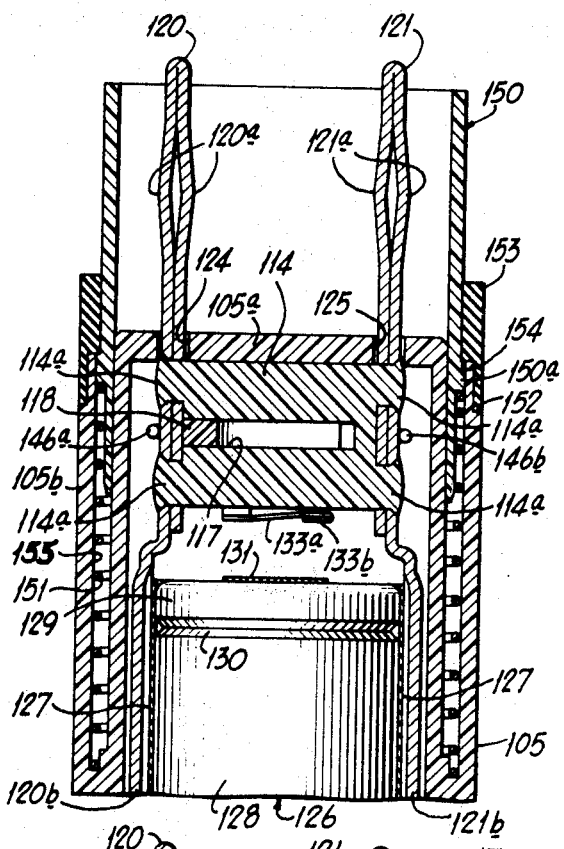
FIG. 19 is a fragmentary, longitudinal, sectional view similar to FIG. 11, illustrating another embodiment of an electric power unit in accordance with the electrical appliance of the present invention.
Figure 20:
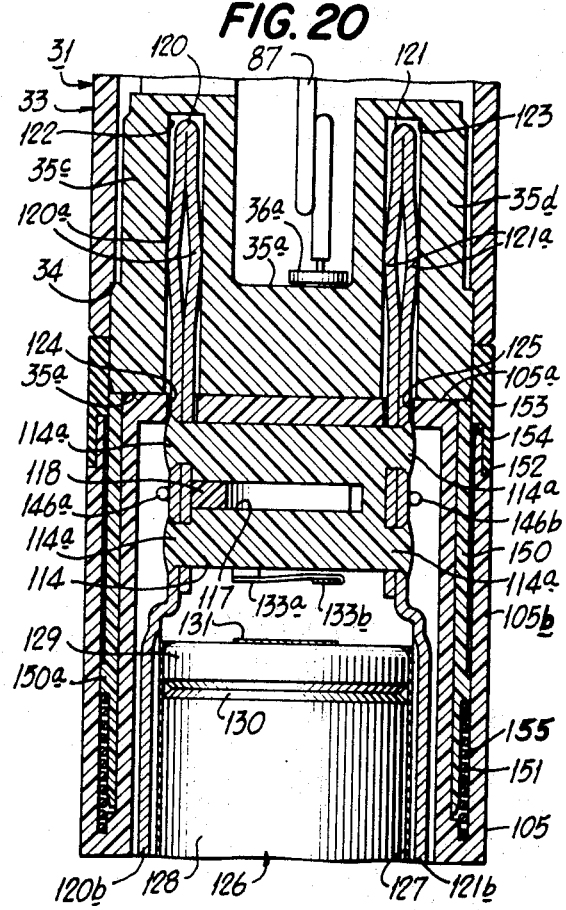
FIG. 20 is a fragmentary sectional view similar to FIG. 16 illustrating the modified electrical power unit of FIG. 19 as assembled together with a motive power unit.

Referring now to FIGS. 19 through 20, therein is shown the upper end portion of a modified electrical power unit in accordance with the present invention. This electrical power unit is similar to the unit 32 previously described and similar reference numerals will be used for similar or identical components therein. The upper end portion of the cylindrical housing 105 has a relatively thick wall section in order to provide for an upwardly opening, annular recess 155 extending around the end wall 105a and thereby forming a short, annular, spaced, outside wall portion 105b.

The recess 155 is adapted to receive a retractable annular shield member 150 slidable longitudinally therein and normally biased outwardly by a coil spring 151 having one end seated against the lower end of the recess and an opposite end seated against the lower surface of an annular ridge 150a projecting outwardly and intermediate the ends of the shield member. The spring 151 normally biases the shield member outwardly into the position shown in FIG. 19 wherein the shield member affords protection for the plug terminals 120 and 121 when the power unit is not plugged into a wall socket.

When the electrical power unit is plugged into the motive power unit 31, as shown in FIG. 20, the spring 151 is compressed and the shield is forced inwardly into the recess 155 to the position shown wherein the upper end of the shield bears against the surface 35a on the lower end of the motive power unit 31.

The outside wall portion 105b of the housing 105 is formed with an annular recess 152 annexed to the outer edge at the upper end and a metal annular ring 153 is seated in the recess and projects upwardly beyond the end wall 105. The metal ring strengthens the relatively thin upper end of the wall portion 105b and is firmly affixed thereto. This ring is slightly smaller in internal diameter than the wall portion 105b and forms an annular shoulder 154 for engagement with the upper surface of the shield ridge 150a to limit the outward extension thereof.

The lower end of the housing 33 on the motive power unit 31 is modified slightly so that the lower surface 35a of the end plug 35 is spaced below the lower end of the housing wall. When the motive power and electrical power units are plugged together (FIG. 20), the upper portion of the metal ring 153 encircles the lower portion of the plug 35 and aids in mechanically coupling the power units 31 and 32 together. Thus the modified units shown in FIGS. 19 and 20 incorporate the advantages of a shielding device 150 for the terminal members 120 and 121 when the units are disassembled and a stronger mechanical coupling between the units when they are plugged together for use.

Figure 21:
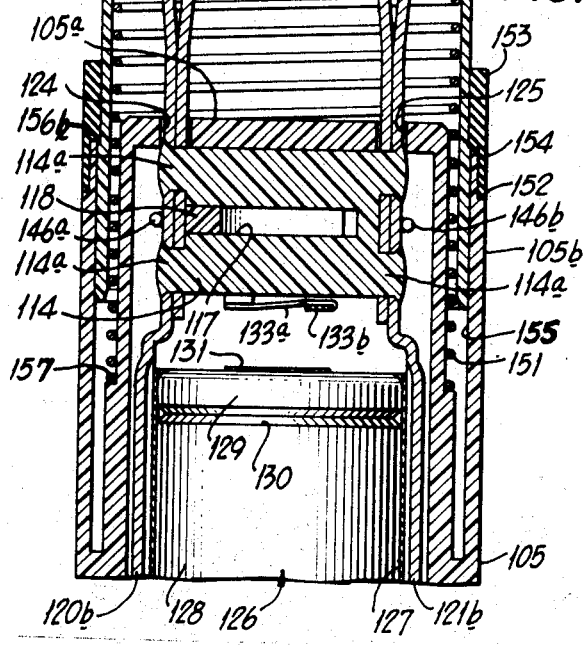
FIG. 21 is a fragmentary, longitudinal, sectional view similar to FIG. 11, illustrating still another embodiment of an electrical power unit in accordance with the present invention.

FIG. 21 illustrates another unit having a modified form of shield member 156 with an inwardly projecting annular ring 156a at the upper end for retaining the upper end of the bias spring 151. The recess 155 is formed with an inner annular shoulder surface 157 against which the lower end of the spring is seated and the recess extends well below this shoulder surface to accommodate the lower end of the retractable shield member 156 when it is in a retracted position (not shown). Upward movement of the shield out of the recess is limited by engagement of the surface 154 on the metal ring 153 with an outer annular shoulder 156b formed on the shield member midway between its ends.

While there have been illustrated and described several embodiments of the present invention, it will be appreciated that numerous changes and modifications will occur to those skilled in the art, and it is intended in the appended claims to cover all those changes and modifications which fall within the true spirit and scope of the present invention.

What is claimed as new and desired to be secured by Letters Patent of the United States is:

1. An electric toothbrush comprising an elongated tubular housing, a main shaft mounted in said housing for oscillating angular motion about its longitudinal axis and including an outer end portion projecting longitudinally outward from one end of said housing adapted to receive a toothbrush detachably mounted thereon, an electric motor in said housing including a rotatable armature shaft in coaxial alignment along the longitudinal axis of said housing and in spaced parallel relation with said main shaft, pinion gear means mounted on said armature shaft, driven gear means drivingly engaged by said pinion gear means and mounted on stub shaft means rotatable on a transverse axis normal to said armature shaft and main shaft, pin means on said driven gear means eccentric of said transverse axis and substantially parallel thereto, and drive fork means mounted on said main shaft including a pair of legs spaced radially outwardly thereof and generally parallel thereto, said legs disposed on opposite sides of said eccentric pin means and drivingly engaged therewith for oscillating said main shaft about its longitudinal axis when said driven gear means is rotated by said motor.

2. The electric toothbrush of claim 1 wherein said eccentric pin means includes an annular outer surface comprising a portion of a sphere, said surface being in engagement between opposed facing, contact portions on said legs, said contact portions formed with elongated surfaces comprising segments of cylinders disposed tangent and perpendicular to the spherical surface portion of said eccentric pin means.

3. The electric toothbrush of claim 1 including a pair of frame members extending outwardly of said one end of said motor and having opposed, abutting faces keyed together, each of said faces having first recess means for supporting said stub shaft means for rotation and second recess means for supporting said main shaft for rotation when said frame members are assembled together.

4. The electric toothbrush of claim 3 wherein each of said frame members is formed with an enlarged central opening therein in communication with said first and second recess means, said pinion gear means, said driven gear means and said eccentric pin being disposed in said frame openings.

5. The electric toothbrush of claim 4 wherein said drive fork means projects into and is freely movable laterally with respect to the longitudinal axis of said housing within said openings in said frame members.

6. The electric toothbrush of claim 3 wherein each of said frame members includes an integral base portion extending generally normal to the abutting face and engaging and secured to said one end of said motor.

7. A cordless, portable, electrical toothbrush comprising a motive power unit including an elongated, tubular housing and motor means therein having an armature shaft extending longitudinally of said housing, an implement drive shaft parallel of said armature shaft projecting outwardly from one end of said housing and driven by said motor, said drive shaft having an outer end portion adapted to receive a toothbrush detachably connected thereto, reduction gear means drivingly interconnecting said armature shaft of said motor means and said drive shaft to oscillate the latter upon rotation of the former, said reduction gear means including a gear driven idler shaft normal to said implement drive shaft, support frame means attached to one end of said motor means for supporting said reduction gear means and said implement drive shaft, said support frame means including a pair of separate support members attached together and each having recesses defined therein forming a portion of a bearing surface for supporting said drive shaft and said idler shaft, an electrical power unit including an elongated tubular housing and rechargeable battery means therein for supplying electrical power to said motor means, and pin and socket connector means provided at the other end of said motor power unit housing and one end of said electrical power unit housing for mechanically and electrically interconnecting said units when assembled together in end-to-end relation, said connector means being operable to permit disconnection of said units upon lognitudinal movement thereof away from one another.

8. The appliance of claim 7 wherein said pin and socket connector means includes a pair of spaced apart, male, power terminals projecting outwardly from said one end of the housing of the electrical power unit adapted to be plugged directly into a wall outlet for charging said battery means.

9. The appliance of claim 8 wherein said pin and socket connector means includes a pair of recesses formed in said other end of the housing of said motive power unit for receiving said male power terminals to mechanically interconnect said units when plugged together in end-to-end relation, said recesses and power terminals being symmetrically disposed relative to the longitudinal axes of said respective housings on the respective ends thereof.

10. The electrical appliance of claim 9 wherein said pin and socket connector means includes a second pair of spaced, male terminals and a second pair of cooperating spaced recesses provided on the respective ends of said housings for supplying current from said battery means to said motor means when said units are assembled in end-to-end relation.

11. The electrical appliance of claim 10 wherein said second pair of spaced male terminals and said second pair of recesses are disposed in unsymmetrical relation on the ends of said housings with respect to said power terminals and said first mentioned pair of recesses for insuring proper polarity of connection between said battery and said motor when said units are assembled together in end-to-end relation for use.

12. The electrical appliance of claim 7 wherein said housings are of substantially equal cross-section adjacent their ends adapted to be interconnected, said housing of said electrical power unit having a portion of larger cross section adjacent its lower end forming a handle butt portion for said appliance when said units are assembled together in end-to-end relation.

13. A cordless, portable, electrical toothbrush comprising a motive power unit including an elongated, tubular housing and motor means therein having an armature shaft extending longitudinally of said housing, an implement drive shaft parallel of said armature shaft projecting outwardly from one end of said housing and driven by said motor, said drive shaft having an outer end portion adapted to receive a toothbrush detachably connected thereto, reduction gear means drivingly interconnecting said armature shaft of said motor means and said drive shaft to oscillate the latter upon rotation of the former, an electrical power unit including an elongated tubular housing and rechargable battery means therein for supplying electrical power to said motor means, and pin and socket connector means provided at the other end of said motive power unit housing and one end of said electrical power unit housing for mechanically and electrically interconecting said units when assembled together in end-to-end relation, said connector means being operable to permit disconnection of said units upon longitudinal movement thereof away from one another, said housing of said electrical power unit having an annular recess denfined in said one end, tubular shield means mounted in said recess for movement outwardly thereof to a shielding position for protecting said outwardly projecting third terminal means when said electrical power unit is disconected from said motive power unit.

14. The electric toothbrush of claim 13 including spring means in said annular recess for biasing said shield means to said outward shielding position, said shield means including an outer end surface engageable with said lower end of said casing for moving said shield means into said annular recess when said units are connected together in longitudinal end-to-end relation.

References Cited

UNITED STATES PATENTS

| | | |
|---|---|---|
| 3,067,373 | 12/1962 | Hopt et al. |
| 3,274,631 | 9/1966 | Spohr _____ 15—22 |
| 3,343,192 | 9/1967 | Goldstein et al. _____ 15—23 |
| 3,183,538 | 5/1965 | Huber _____ 15—22 |

FOREIGN PATENTS 1,119,384   12/1961   Germany.

EDWARD L. ROBERTS, Primary Examiner

U.S. Cl. X.R.

74—45; 320—2